United States Patent [19]
Dlugos

[11] 4,047,586
[45] Sept. 13, 1977

[54] ZERO LOAD ADJUSTMENT APPARATUS FOR SPRING WEIGHING SCALE

[75] Inventor: Daniel F. Dlugos, Huntington, Conn.

[73] Assignee: Pitney-Bowes, Inc., Stamford, Conn.

[21] Appl. No.: 669,528

[22] Filed: Mar. 23, 1976

[51] Int. Cl.$^2$ .......................................... G01G 23/26
[52] U.S. Cl. .................... 177/210 R; 177/DIG. 6; 250/237 G; 356/169
[58] Field of Search ............... 177/1, DIG. 6, 210 R, 177/229, 164; 250/237 G, 231 R, 231 SE; 356/169

[56] References Cited

U.S. PATENT DOCUMENTS

| | | | |
|---|---|---|---|
| 3,757,126 | 9/1973 | Tumbush | 250/237 G X |
| 3,867,037 | 2/1975 | Litke | 356/169 |
| 3,923,110 | 12/1975 | Dan | 177/210 |

*Primary Examiner*—Joseph W. Hartary
*Attorney, Agent, or Firm*—Robert S. Salzman; William D. Soltow, Jr.; Albert W. Scribner

[57] ABSTRACT

A spring weighing scale includes an optical detector which generates a moire fringe pattern and moves the pattern as an optically amplified function of scale tare deflection. A first of a pair of parallel optical gratings moves with a scale tare structure, while a second reticle grating remains fixed. Passing through both gratings is a light beam which projects a fringe pattern upon a photodetector array. Placement of a load upon the scale results in movement of successive fringes across the photodetectors and the sequential generation of weight indicative signals which are counted to determine load weight. Automatic zero load adjustment is effected by a displacement linkage driven by a stepping motor to provide displacement of the photodetector array along the axis of pattern movement. The motor is controlled by a counter monitor to register the photodetector array with the pattern image no load position such that a null count is produced. The linkage employs a twin parallel threaded worm and socket to provide any requisite compensatory shift of a chassis which carries the photodetector array. In a further embodiment, the photodetector chassis is supported by a pair of parallel leaf springs which bias the chassis against an adjustment worm driven by the motor. Alternately, a sine bar sliding wedge is worm driven against the bias of the leaf springs to displace the chassis.

15 Claims, 8 Drawing Figures

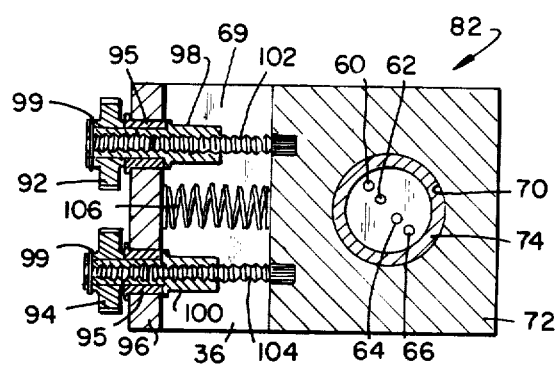
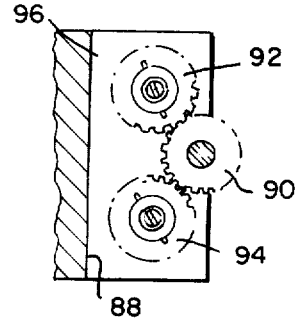
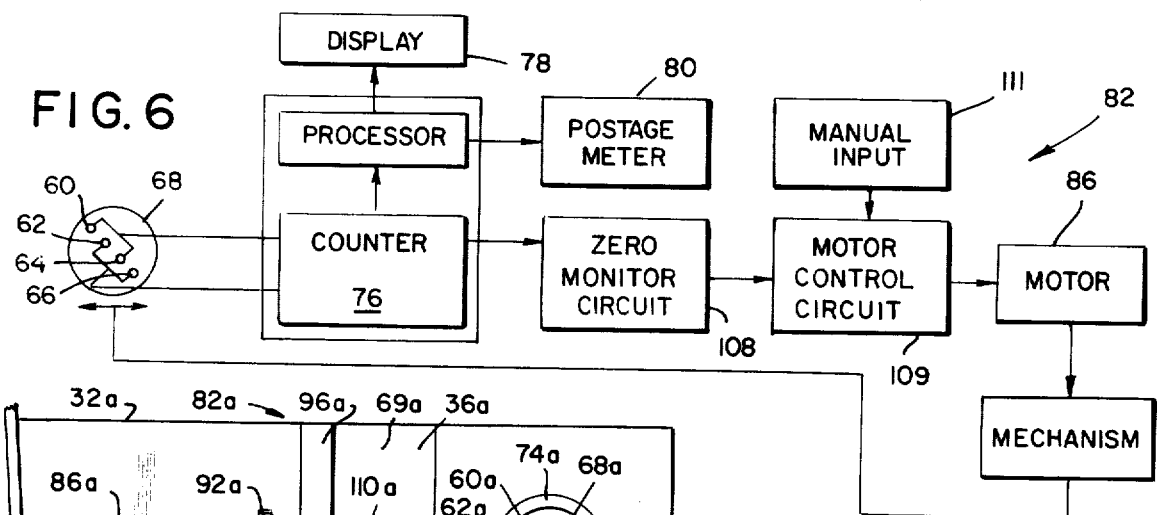
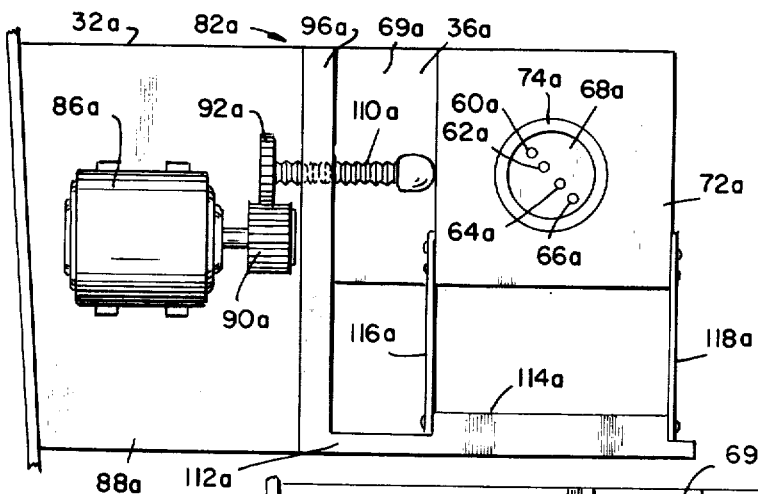
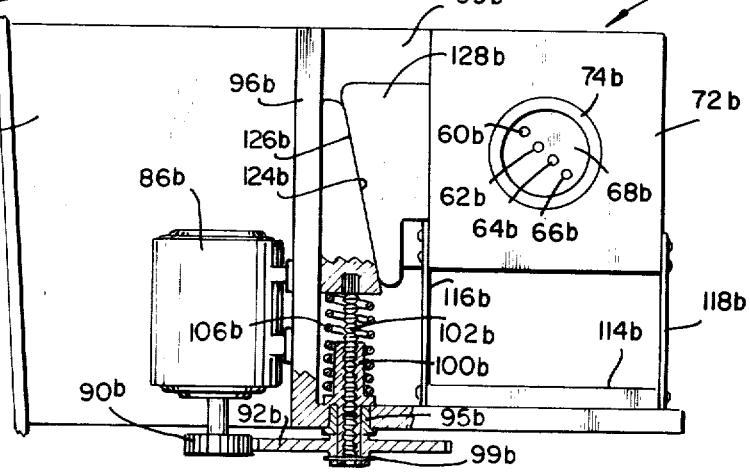

ZERO LOAD ADJUSTMENT APPARATUS FOR SPRING WEIGHING SCALE

BACKGROUND OF THE INVENTION

1. Field of the Invention

The invention relates generally to mass measuring and more particularly to an automatic zero load adjustment mechanism for a weighing system.

2. Brief Description of the Prior Art

A typical zero load adjust mechanism for spring scales employed an auxiliary biasing spring and has been disclosed in U.S. Pat. No. 3,806,517. One end of the auxiliary spring was adjustably anchored to the scale frame, while the other end was connected to the scale tare structure. The zero load tare position was adjusted through variation of the preload force applied to the tare by the auxiliary spring. Adjustment was accomplished with a threaded shaft and nut at the fixed anchor.

Utilization of auxiliary biasing springs for no load adjustment of scales has presented several disadvantages which have not only detracted from the accuracy of weight determinations but have resulted in increased costs. Initially, zero adjust mechanisms added costs due to the cost of the biasing spring, its associated mountings and the added assembly costs. It should be noted that the biasing spring itself was required to be thermally matched with the main scale spring.

Naturally, the adjust mechanism introduced error due to the addition of a further moving part in the scale. Such error could be attributed to numerous factors, including friction loss at the biasing spring mountings, spring hysteresis, etc. Further, as the compensating force applied by the biasing spring increased, error increased. Another disadvantage encountered with the use of zero biasing springs was that these relatively small springs were susceptible to vibration which was especially undesirable in high speed weighing environments.

In U.S. Pat. No. 3,917,012 an automated zero load adjust mechanism has been disclosed in conjunction with a high speed automated mail processing system for sorting, weighing and imprinting postage on large quantities of mixed mail. The system employed in optical readout apparatus for detecting the deflection of a weighing scale tare when supporting a piece of mail. This prior apparatus included a bank of multiple photodetectors at the end of a light path. A shutter carried by the tare was operable to gradually block the light path to successive photodetectors of the bank. A signal indicative of the number of photodetectors remaining in the light path, hence tare deflection, was produced and utilized to set the postage to be imprinted on the piece of mail.

The system employed an automatic zero adjust mechanism which varied a preload force applied to the scale tare by an auxiliary biasing spring. The first photodetector of the bank sensed deviation of the scale tare from zero load position and actuated a motor and worm drive to adjustably vary the position of one end of the biasing spring, the other end of which was linked to the tare.

This automatic system encountered problems relating to motor shut-off characteristics which resulted in motor and worm drive drift. Such error was compounded with the disadvantages of conventional auxiliary spring zero adjust mechanisms. It should be appreciated that because the mail processing system of U.S. Pat. No. 3,917,012 dictated high speed, cyclic weighing of successive pieces of mail, instability, i.e. oscillation, of the zero adjust device was undesirable. In order to reduce instability, it was necessary to provide relatively wide dead band and thus sacrifice automatic zero resolution.

Further disadvantages of this prior zero adjust mechanism related to the prior optical readout apparatus itself. The particular transition point wherein the photodetectors switched from conduction to nonconduction states had to be precisely set, and such transition point was highly critical with tolerance requirements rendering final adjustments difficult and time consuming. Furthermore, a relatively large projection path of the detector, e.g. 18 inches-24 inches (45-60 cm.), was required in order to obtain the necessary optical magnification. Such large projection path rendered accuracy of detector readouts and control of the automatic zeroing function highly sensitive to vibrations and other environmental conditions.

SUMMARY OF THE INVENTION

In compendium, the present invention relates to a spring weighing scale having an optical detector which senses tare deflection by detecting the movement of a moire fringe pattern. The fringe pattern is generated by modulation of a light beam by a pair of ruled parallel optical gratings. One of the gratings deflects with the scale, while the other grating is fixed. The deflection of the movable grating results in the movement of successive fringes of the pattern across an array of photodetector pairs. the photodetector pairs sequentially generate self-reinforcing signals which are fed to an up-down counter to determine load weight.

Automatic zero load count is achieved by providing a lateral compensating shift of a chassis carrying the photodetectors. The photodetector array is shifted along the axis of pattern movement to a position complementary with the pattern no load position.

A zero monitor controls a stepping motor to actuate a displacement linkage which shifts the chassis. A typical linkage comprises a twin worm and socket drive between the stepping motor and the chassis.

In another embodiment, the chassis is carried by a pair of parallel leaf springs which bias the chassis against a single adjustment worm driven by the stepping motor. A further embodiment utilizes a linkage comprising a wedge driven by a worm. The wedge slidingly engages a mating wedge fixed to the chassis. As in the single worm embodiment, parallel leaf springs bias the chassis against the driving wedge.

From the foregoing compendium, it will be appreciated that it is an object of the present invention to provide a zero load adjustment apparatus of the general character described for use in conjunction with a spring weighing scale which, however, is not subject to the disadvantages aforementioned.

Another object of the present invention is to provide a zero load adjustment apparatus of the general character described for use in conjunction with a spring weighing scale, which apparatus provides compensation for scale tare preload condition at an optical detector.

A further object of the present invention is to provide a zero load adjustment apparatus of the general character described for use in conjunction with a spring weighing scale which apparatus compensates for scale tare preload position without altering the tare zero load condition.

Yet another object of the present invention is to provide a zero load adjustment apparatus of the general character described for use in conjunction with a spring weighing scale which apparatus minimizes the number of components moving with the scale tare.

A still further object of the present invention is to provide a zero load adjustment apparatus for use in conjunction with a soring weighing scale which apparatus is economical, simple in construction and utilizes but a modicum of moving parts.

Another object of the present invention is to provide a zero load adjustment apparatus for use in conjunction with a spring weighing scale which apparatus is not susceptible to self-induced, vibration based error.

A further object of the present invention is to provide a zero load adjustment apparatus of the general character described for use in conjunction with a spring weighing scale which apparatus is reliable, efficient, accurate, and automatically controlled.

A further object of the present invention is to provide a scale of the general character described having an optical detector which detects tare deflection by sensing the movement of a fringe pattern and includes an automatic zero load adjustment appartus which compensates for no load tare position by moving a light-sensitive portion of the detector to seek the fringe pattern no load image.

Another object of the present invention is to provide a spring weighing scale optical detector of the general character described having a photodetector array for sensing the movement of a fringe pattern and a zero load adjustment apparatus for moving the photodetector array to seek the fringe pattern no load position.

Yet a further object of the present invention is to provide a method of adjusting a scale optical detector to provide compensation for variations in scale tare no load position.

Other objects of the invention in part will be obvious and in part will be pointed out hereinafter.

With these ends in view, the invention finds embodiment in certain combinations of elements and arrangements of parts and series of steps by which the objects aforementioned and certain other objects are attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention;

FIG. 4 is a fragmentary sectional view through the zero load adjustment chassis said view taken substantially along the line 4—4 of FIG. 5 and illustrating a pair of vertically spaced parallel gear driven sockets which threadingly engage a pair of horizontal worms extending from the chassis to provide requisite zero adjust displacement;

FIG. 5 is an auxiliary view illustrating typical gearing between a stepping motor and the driving sockets of the zero adjust appartus, the same being taken substantially along line 5—5 of FIG. 3;

FIG. 6 is a schematized diagram illustrating a typical zero adjust control from the photodetector array to an up-down counter with one of the counter outputs leading to a zero monitor for actuation of a stepping motor drive of the zero adjust apparatus;

FIG. 7 is an elevation view of an alternate embodiment of the zero adjust apparatus wherein displacement of the chassis is achieved by a worm engaging the chassis against the bias of a pair of parallel leaf springs; and FIG. 8 is an elevational view of a further embodiment of the zero adjust apparatus wherein displacement of the chassis is achieved through a worm driving a sine bar.

DESCRIPTION OF THE PREFERRED EMBODIMENTS

Figure 1:
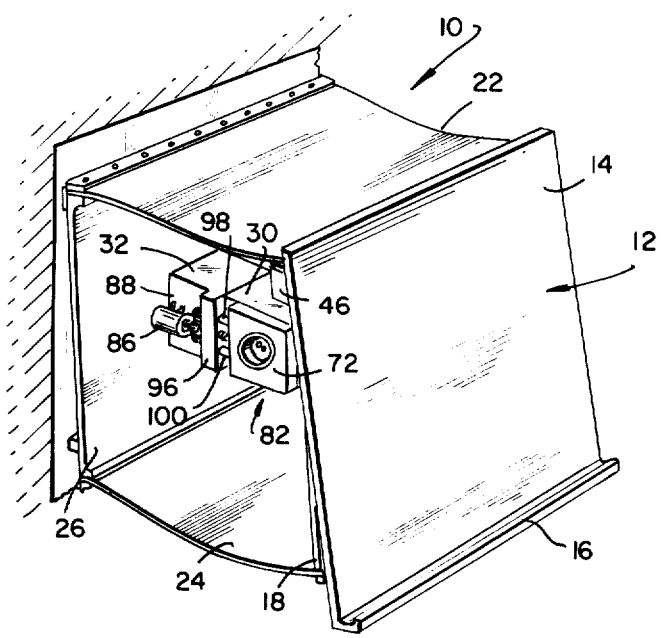
FIG. 1 is a perspective illustration of a typical leaf spring weighing scale illustrating an optical detector which generates a moire fringe pattern for detection of scale tare deflection and a zero load adjustment apparatus constructed in accordance with the invention which provides a compensating displacement of a photodetector array of the optical detector.

Referring now in detail to the drawings wherein typical exemplary embodiments of the invention are illustrated, the reference numeral 10 denotes a leaf spring scale similar in construction to the scale described in U.S. Pat. No. 3,861,480, issued Jan. 21, 1975, The scale 10 is designed to provide substantially linear deflection as a result of the weight of a load carried in a tray 12. The tray 12 includes a side wall 14 slightly tilted from a vertical plane and an envelope supporting trough 16 which projects from its lower edge. When an envelope is supported by the scale 10, it remains substantially upright with its bottom edge cradled in the trough 16 while its rear panel leans against the tray's side wall 14.

The tray 12 is affixed to a tare structure 18 by conventional means such as a pair of spaced brackets 20, while the tare structure is secured to the distal edges of a pair of horizontally oriented, vertically spaced, broad leaf springs 22, 24. Each leaf spring is cantilever supported at its opposite edge to an inclined mounting frame 26 and is more fully described in U.S. Pat. Nos. 3,861,480 and 3,807,517. A leaf spring scale of such design provides substantially linear vertical deflection in response to various loads carried by the tray 12 over a predetermined working load range.

While the scale 10 is particularly well adapted for use in conjunction with a high speed mailing system, it should be appreciated that the particular scale per se does not form an aspect of the invention and, without departing from the instant invention, various modifications may be made to the scale such as the orientation of the tray 12 in a horizontal position as illustrated in the scale of U.S. Pat. No. 3,807,517 issued Apr. 30, 1974 or the utilization of spring scale systems other than the leaf spring system shown in the drawings.

An optical detector 28 is positioned within the scale 10 between the leaf springs 22, 24 such that vertical tare structure displcement as a result of a load being positioned on the tray 12 will be detected. As previously mentioned, the movement of a moire fringe pattern for the detection and measurement of load weight is utilized in the present invention. For this purpose, a pair of ruled parallel, optical gratings on transprent substrates is provided with one of the gratings being fixed and the other grating moving with the tare structure 18 in a plane parallel to the fixed set. By way of example, the gratings of each grating may comprise Ronchi rulings spaced two thousandths of an inch apart, however spacings between the rulings of each grating may vary and need not be equal.

The detector 28 includes a generally U-shaped frame 30 which is fixed to a supporting block 32 extending from the scale mounting frame 26. A pair of spaced parallel legs 34, 36 of the detector frame 30 project toward the tare structure 18. Each of the legs include a transverse bore 38 extending along a horizontal axis. A reticle grating 40 formed on a planar face of a transparent, e.g. glass, substrate 42 is mounted at the end of a sleeve 44 seated in the bore 38 of the leg 36 with the grating 40 adjacent the interior bore end.

To provide the interference pattern, a movable grating 46 is positioned between the legs 34, 36 in a vertical plane adjacent and parallel to the reticle grating 40. The movable grating 46 is formed on a planar surface of a transparent substrate 48 and clamped within a vertical supporting channel 50. The channel 50 is mounted to the tare structure 18 at its upper and lower ends by conventional means such as brackets. The planar grating face of the movable substrate 48 is abutted against a flat vertical inner flange wall of the channel 50 and tightened in such position by a plurality of clamping screws 52 which apply pressure against an abutment shim 54.

The optical gratings 40, 46 modulate a light beam projected from a lamp 56 which is mounted to the exterior face of the leg 34 with the lamp filament extending transversely across the bore 38 of the leg 34. A condensing lens 58 is positioned between the lamp 56 and the movable substrate 48 to project a light beam perpendicular to the planes of the gratings 40, 46. Because the rulings of the reticle grating 40 are positioned at a slight skew angle with respect to the rulings of the movable gratings 46, interference between the two gratings modulates the light beam to include a plurality of cyclic, parallel, substantially vertical, moire fringes.

The placement of a load on the tray 12 causes the tare structure 18 and the movable grating 46 to move downwardly. Due to the extended lateral width of the leaf springs 22, 24 lateral deflection of the grating 46 during such downward movement is prevented. Thus, both gratings 40, 46 are maintained at precisely parallel spaced relationship permitting the projection of the moire pattern with high resolution.

Vertical movement of the grating 46 results in cyclic, horizontal movement of successive, substantially vertically oriented moire fringes of the interference pattern. The fringe movement is detected and counted to provide signals indicative of the weight of the load carried by the tray 12. Such signals in an application such as an automated mail provessing system may be processed and utilized to determine and set the requisite postage to be imprinted upon the load at a subsequent station.

Movement of the interference pattern is transducer by a plurality of photodetectors 60, 62, 64, and 66. Although four photodetectors have been illustrated, satisfactory results have been obtained with but two photodetectors having the capacity to sense both magnitude and direction of pattern movement. The photodetectors 60, 62, 64, 66 are mounted within a nonconducting disc 68, equidistantly spaced from one another and positioned along an axis coincident with a diagonal of the disc. The disc 68 is adjustably positioned at the terminal end of the light path adjacent an exterior face 69 of the leg 36. The disc 68 is adjustably held within a bore 70 of a photodetector chassis 72. The chassis 72 slidably abuts the face 69 of the leg 36. A sleeve 74 positioned within the bore 70 carries the disc 68.

It should be appreciated that each of the photodetectors is optimally placed 90° apart from each adjacent photodetector with respect to the moire interference pattern cycle, the image of which moves across the photodetector array. The photodetectors 60, 64 are arranged to provide a single output signal while the photodetectors 62, 64 are similarly arranged to provide a single output signal. Each interconnected pair of photodetectors is physically disposed 90° from each other so that the combined output signal of each pair is in phase quatrature with respect to the other pair and provides a reinforcement signal for the other pair.

The output signals of the photodetector pairs are fed to an up-down counter 76 and the counter output is fed to a display 78 utilizing a circuitry well known in the art, for example that shown in U.S. Pat. Nos. 2,886,718 or 3,713,139. A further output may be utilized to set the amount of postage to be imprinted at a postage meter 80.

Pursuant to the present invention, the optical detector 28 includes an automatic zero load adjustment apparatus 82 which will assure true and accurate weight readings by compensating for minor changes in the scale tare no load position due to environmental conditions such as accumulations of dust and variations in ambient temperature.

Departing from prior art zero load adjustment devices, the present apparatus 82 provides a compensating adjustment at the detector rather than through corrective adjustment of the actual tare no load position. Generally, the present invention achieves zero load adjustment by physically moving the array of photodetectors 60, 62, 64, 66 along the axis of fringe pattern movement to a position wherein the photodetector array is registered with the pattern image no load position thereby producing a null count at the counter 76.

Figure 2:
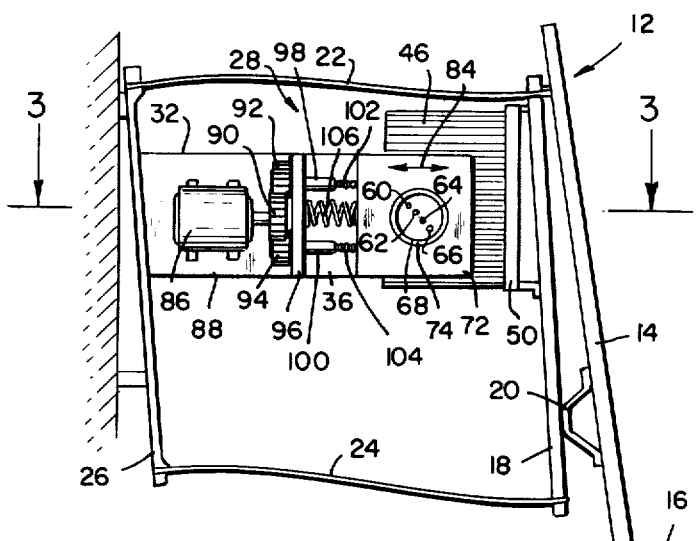
FIG. 2 is a side elevation view of the scale, more clearly illustrating the optical detector and the zero load adjustment apparatus.
Figure 3:
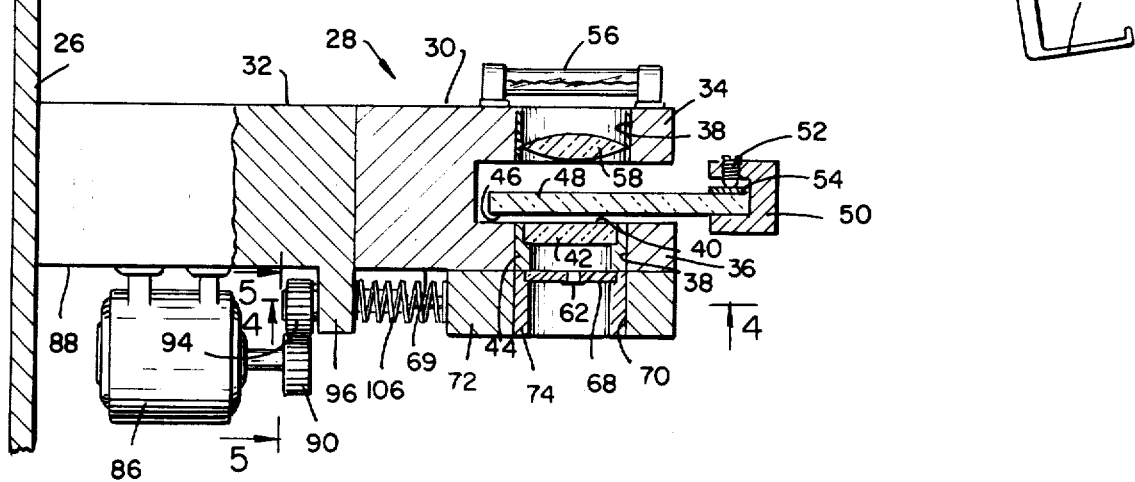
FIG. 3 is a fragmentary sectional view through the scale and optical detector with portions of the scale deleted, the same being taken substantially along line 3—3 of FIG. 2 and depicting a light source, a condensing lens, a pair of optical gratings, and a photodetector array mounted to a slidable chassis for zero load adjustment of the detector.

Movement of the photodetector array is effected by laterally displacing the photodetector chassis 72 in the reciprocal direction of the heavy arrow 84 (shown in FIG. 2). A stepping motor 86 mounted to a vertical face 88 of the supporting block 32 drives a displacement linkage. The output shaft of the stepping motor 86 includes a driving gear 90 which engages a pair of driven gears 92, 94. The gears 92, 94 drive a pair of hollow threaded sockets 98, 100, respectively, each being coaxial with its driving gear and secured thereto by a pin 99. Each of the sockets 98, 100 is journalled for rotation in a bearing 95 seated in a vertical flange 96 projecting from the block face 88. Seated in each socket is a matingly threaded worm 102, 104, the opposite end of which is fixedly anchored in the photodetector chassis 72.

It will be appreciated that incremental rotation of the stepping motor output shaft will provide incremental rotation of the gears 92, 94 providing displacement of the photodetector chassis along a horizontal plane. A helical coil spring 106 is positioned between the chassis 72 and the flange 96 to provide a preload force which reduces the gear and worm backlash.

With reference now to FIG. 6 wherein a typical control circuit for automatic actuation of the zero adjust apparatus 82 is depicted, a zero monitor circuit 108 comprising a comparator is shown receiving one of the outputs of the up-down counter 76. In operation, the monitor circuit 108 detects minor plus or minus deviations from absolute null or zero count of the counter 76 and feeds an output signal to a motor control circuit 109 which controls the extent and direction of stepping motor rotation. Through the gearing and worm-socket displacement mechanism rotation of the motor output shaft provides lateral displacement of the photodetector chassis 72. The photodetector array is displaced with respect to the interference pattern no load image to a position coincident with a null count at the counter 76 as detected by the monitor circuit 108. With the photodetector array at such position, the motor control circuit 109 no longer actuates the motor 86. A manual select override input 111 may be optionally provided to selectively disengage the automatic zero adjust function. Because linkage backlash is reduced by the spring 106 and further due to the advance of the motor 86 in increments, precise control over the photodetector array position is obtained.

In an alternate embodiment, illustrated in FIG. 7, wherein like numerals denote like components previously described, however bearing the suffix "a", the numeral 82a denotes generally an automatic zero adjustment apparatus constructed in accordance with the invention. In a manner similar to the previous embodiment, the apparatus 82a is designed to provide controlled compensating lateral adjustment of a photodetector chassis 72a which carries a photodetector array and which forms a part of an optical detector 28a otherwise identical to the optical detector heretofore described.

In this embodiment, a stepping motor 86a is secured to a face 88a of a supporting block 32a. The output shaft of the motor 86a is fixed to a driving gear 90a and engages a driven gear 92a. The gear 92a is fixed to a threaded worm 110a which extends through a matingly threaded opening in a vertical flange 96a which projects from the face 88a. It should be appreciated that rotation of the driven gear 92a will cause the worm 110a to be displaced axially toward or away from the chassis 72a. The thickness of the gear 92a is such that limited gear rotation, while producing axial displacement of the gear 92a, will not result in gear disengagement.

A horizontal flange 112a extends from the lower edge of the vertical flange 96a toward the photodetector chassis 72a and includes an upwardly projecting platform 114a substantially registered with the photodetector chassis 72a. A pair of upright parallel leaf springs 116a, 118a interconnect the vertical side edges of the photodetector chassis 72a with the vertical edges of the platform 114a and serve to support the chassis 72a while at the same time biasing a vertical edge of the chassis against a distal rounded head of the worm 110a.

The stepping motor 86a is controlled in an identical manner as the stepping motor 86 previously described. Due to the parallel arm linkage between the chassis 72a and the platform 114a, movement of the chassis 72a will not lie on a true horizontal plane but will take a somewhat arcuate course. Such deviation from planar horizontal displacement of the photodetector array will not introduce error into the weighing system because all of the photodetector pairs of the array move simultaneously and are displaced as a unit with respect to the interference pattern image which moves horizontally.

A still further embodiment of the invention is illustrated in FIG. 8 wherein like numerals denote like components previously described, however bearing the suffix "b". In this embodiment the numeral 82b denotes an automatic zero adjust apparatus embodying the invention and similar in construction to the embodiment illustrated in FIG. 7.

This embodiment employs a sine bar sliding wedge to provide a displacement reduction linkage for more precisely controlled displacement of a photodetector chassis 72b. A stepping motor 86b similar in construction to the stepping motor 86 heretofore described is mounted on a vertical face 88b of a supporting block 32b, however the motor is positioned with its output shaft vertical rather than being horizontally oriented.

A driving gear 90b is fixed to the motor output shaft and engages a driven gear 92b. A pin 99b secures a hollow threaded socket 100b to the gear 92b. The socket 100b is journalled for rotation in a bearing 95b seated in a horizontal flange 112b which extends from the block 32b. Seated in the socket 100b is a matingly threaded worm 102b, the opposite end of which is anchored in a wedge 122b.

An upright face of the wedge 122b slidingly abuts a vertical flange 96b extending from the block 32b while an inclined face 124b slidingly abuts an inclined face 126b of a mating wedge 128b fixed to the photodetector chassis 72b.

Controlled rotation of the stepping motor 86b provides, through the gears 90b, 92b, rotation of the socket 100b. Engagement between the socket 100b and the worm 102b provides vertical movement of the wedge 122b. The sliding engagement between the wedges 122b, 128b provides mechanically reduced horizontal displacement of the photodetector chassis 72b for automatic zero adjustment. A helical coil spring 106b is positioned between the wedge 122b and a shoulder of the socket 100b to provide a preload force which reduces backlash.

The photodetector chassis 72b is supported in a manner identical to that of the photodetector chassis 72a of the previous embodiment with a pair of leaf springs 116b, 118b which depend from vertical side edges of the chassis 72b to vertical edges of a platform 114b which projects upwardly from the flange 112b. Control of the stepping motor is previously described with reference to prior embodiments.

Further, it should be appreciated that the leaf springs 116b, 118b, as with the leaf springs of the prior embodiment, are designed to apply a heavy preload force biasing the photodetector chassis toward the respective vertical flanges to reduce system backlash as well as to provide stability under vibration.

Thus, it will be seen that there is provided an automatic zero load adjustment apparatus for a spring weighing scale which achieves the various objects of the invention and which is well suited to meet conditions of practical use.

As various changes might be made in the zero load adjustment apparatus as above set forth, it is to be understood that all matter herein described or shown in the accompanying drawings is to be interpreted as illustrative and not in a limiting sense.

Having thus described the invention, there is claimed as new and desired to be secured by Letters Patent:

1. A zero load adjustment apparatus for a spring weighing scale having an optical detector and adapted to determine load weight as a function of the detected position of a scale tare, the detector including photodetector means for sensing the image of a modulated light beam, the adjustment apparatus comprising means mounting the photodetector means for movement in a plane transverse to the axis of the light beam and means adapted to provide controlled displacement of the photodetector means with respect to the image of the modulated light beam whereby the photodetector means may be registered with an image configuration at a tare no load position such that the photodetector means will provide a zero load signal to provide compensation for changes in the tare no load position.

2. A zero load adjustment apparatus for a spring weighing scale constructed in accordance with claim 1 wherein the means adapted to provide controlled displacement of the photodetector means includes motor means, and actuation means adapted to actuate the motor means only when the tare structure is at a no load position and the photodetector means provides a signal different from a zero load signal.

3. A zero load adjustment apparatus for a spring weighing scale constructed in accordance with claim 2 wherein the scale further includes grating means adapted to modulate the light beam to have an interference pattern including a plurality of cyclic fringes, displacement of the scale tare providing movement of the fringes, the scale further including counter means adapted to determine the weight of the load by counting the movement of the fringes past a reference, the actuation means comprising a monitor, the monitor being operatively connected to the counter means and adapted to compare the counter signal at the tare no load position with a null count signal, the monitor being operatively connected to the motor means and actuating a corrective displacement of the photodetector means, whereby the photodetector means is automatically registered with respect to the image no load position to provide a zero load signal.

4. A zero load adjustment apparatus for a spring weighing scale constructed in accordance with claim 2 wherein the motor means comprises a stepping motor.

5. A zero load adjustment apparatus for a spring weighing scale constructed in accordance with claim 2 wherein the means adapted to provide controlled displacement of the photodetector means further includes a worm and socket drive interconnecting the motor means with the photodetector means.

6. A zero load adjustment apparatus for a spring weighing scale constructed in accordance with claim 2 wherein the means adapted to provide controlled displacement of the photodetector means further includes a worm rotatively driven by the motor means a photodetector chassis, the photodetector means being positioned within the chassis, the displacement means further including spring means biasing the chassis against the worm.

7. A zero load adjustment apparatus for a spring weighing scale constructed in accordance with claim 2 wherein the means adapted to provide controlled displacement of the photodetector means further includes a threaded worm, the worm being operatively driven by the motor means, a first wedge, means interconnecting the first wedge and the worm for translational displacement of the first wedge, a photodetector chassis, the photodetector means being positioned within the chassis, a second wedge, the second wedge being secured to the chassis, each of the wedges having mating sloped faces in sliding engagement, and spring means urging the mating wedge faces toward one another, whereby precisely controlled displacement of the photodetector means is provided.

8. A weighing scale comprising a tare structure including load supporting means, means providing linear displacement of the tare structure as a direct function of the mass of a load being weighed, an optical detector for determining the extent of tare movement, the detector including a pair of optical gratings, means interconnecting one of the gratings with the tare for movement therewith, means fixing the other grating with respect to tare movement, means providing a light beam, the gratings being so positioned as to modulate the light beam to have a cyclic optical interference pattern, the pattern including a plurality of spaced moire fringes, movement of the one grating providing movement of the fringes, photodetector means, the photodetector means being positioned in alignment with the pattern and adapted to detect fringe movement, and zero load adjustment means, the adjustment means including means mounting the photodetector means for movement in a plane transverse to the axis of the light beam and means adapted to provide controlled displacement of the photodetector means with respect to an interference pattern image, whereby the photodetector means may be registered with the pattern image configuration at a tare no load position such that the photodetector means will provide a zero load signal to adjustably compensate for changes in the tare no load position.

9. A weighing scale constructed in accordance with claim 8 wherein the means adapted to provide controlled displacement of the photodetector means includes motor means and actuating means adapted to actuate the motor means when the tare structure is at a no load position and the photodetector means provides a signal different from a zero load signal.

10. A weighing scale constructed in accordance with claim 9 further including counter means adapted to determine the weight of the load by counting the movement of the fringes past a reference, the actuation means comprising a monitor, the monitor being operatively connected to the counter means and adapted to compare the counter signal at the tare no load position with a null count signal, the monitor being operatively connected to the motor means and actuating a corrective displacement of the photodetector means, whereby the photodetector means is automatically registered with respect to the image no load position to provide a zero load signal.

11. An optical detector for a spring weighing scale having a tare structure including load supporting means and means providing linear displacement of the tare structure as a direct function of the mass of a load being weighed, the optical detector comprising a pair of optical gratings, means fixing one of the optical ratings with respect to the tare structure, means operatively interconnecting the other grating to the tare structure for movement therewith, means providing a light beam, the gratings being so positioned as to modulate the light beam to have a cyclic optical interference pattern, the interference pattern including a plurality of spaced moire fringes, the movement of the other grating providing movement of the fringes, photodetector means positioned in alignment with the interference pattern and adapted to detect fringe movement, and zero load adjustment means, the adjustment means comprising means mounting the photodetector means for movement in a plane transverse to the axis of the light beam and means adapted to provide controlled displacement of the photodetector means with respect to an image of the interference pattern whereby the photodetector means may be registered with the pattern image configuration at a tare no load position such that the photodetector means wll provide a zero load signal to compensate for changes in the tare no load position.

12. An optical detector for a spring weighing scale constructed in accordance with claim 11 wherein the means adapted to provide controlled displacement of the photodetector means includes motor means and actuation means adapted to actuate the motor means when the tare structure is at a no load position and the photodetector means provides a signal different from a zero load signal.

13. An optical detector constructed in accordance with claim 12 wherein the scale further includes counter means adapted to determine the weight of the load by counting the movement of the fringes past the photodetector means, the actuation means comprising a monitor, the monitor being operatively connected to the counter means and adapted to compare the counter signal at the tare no load position with a null count signal, the monitor being operatively connected to the motor and adapted to actuate a corrective displacement of the photodetector means, whereby the photodetector means is adjustably registered with respect to the image no load position to provide a zero load signal.

14. A method of providing zero load adjustment of a spring weighing scale having a tare structure with load supporting means movable from a no load position to a loaded position and an optical detector adapted to determine load weight as a function of the detected position of the scale tare structure, the detector including photodetector means adapted to sense the image of a light beam which is modulated as a function of tare deflection and provide a corresponding signal, said method comprising the steps of:
   a. detecting the presence of the tare structure at a no load position;
   b. observing the signal provided by the photodetector means;
   c. comparing the photodetector means signal with a zero load reference signal;
   d. moving the photodetector means in a plane transverse to the axis of the light beam; and
   e. discontinuing the movement of the photodetector means when the observed photodetector means signal is coincident with the reference signal;
   whereby a zero load adjustment is provided.

15. A method of providing a zero load adjustment of a spring weighing scale as set forth in claim 14 wherein the photodetector means is moved incrementally.

* * * * *